United States Patent [19]

Koller et al.

[11] 4,351,355

[45] Sep. 28, 1982

[54] DRAIN VALVE

[75] Inventors: Floyd G. Koller; Ralph H. Drew, Jr., both of Dayton, Ohio

[73] Assignee: Auto-Valve, Inc., Dayton, Ohio

[21] Appl. No.: 158,787

[22] Filed: Jun. 12, 1980

[51] Int. Cl.³ .................... F16K 31/528; F16K 43/00
[52] U.S. Cl. ................... 137/329.06; 251/144; 251/287
[58] Field of Search .................... 137/315, 329, 329.01, 137/329.06, 329.1, 329.2, 329.4; 251/144, 227, 230, 251, 252, 284, 287

[56] References Cited

U.S. PATENT DOCUMENTS

| | | | |
|---|---|---|---|
| 2,796,882 | 6/1957 | Bradley | 137/329.4 |
| 3,220,695 | 11/1965 | Downey et al. | 251/230 |
| 3,698,420 | 10/1972 | Grundy et al. | 137/329.06 |
| 3,703,189 | 11/1972 | Koller | 137/329.06 |
| 4,029,291 | 6/1977 | Carlson | 251/96 |
| 4,221,238 | 9/1980 | Madsen | 251/230 |

*Primary Examiner*—George L. Walton
*Attorney, Agent, or Firm*—Dybvig & Dybvig

[57] ABSTRACT

A drain valve for use in a fuel tank and having a drain port and an axially movable poppet or valve member. The valve member has a first position for closing the port, a second position for opening the port to permit draining of liquid from the fuel tank, and a third position wherein the valve member is lowered to expose a seal thereon for inspection or replacement. A valve stem is connected to the valve member and has a pin with ends projecting therefrom. A retainer assembly comprised of two identical, interfitting retainer members has slots for receiving the ends of the pin and surfaces for supporting the pin and, in turn, the valve member when the valve is either opened or closed.

13 Claims, 14 Drawing Figures

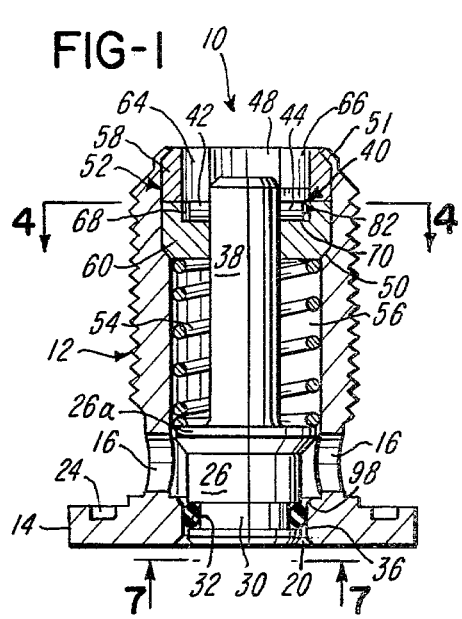
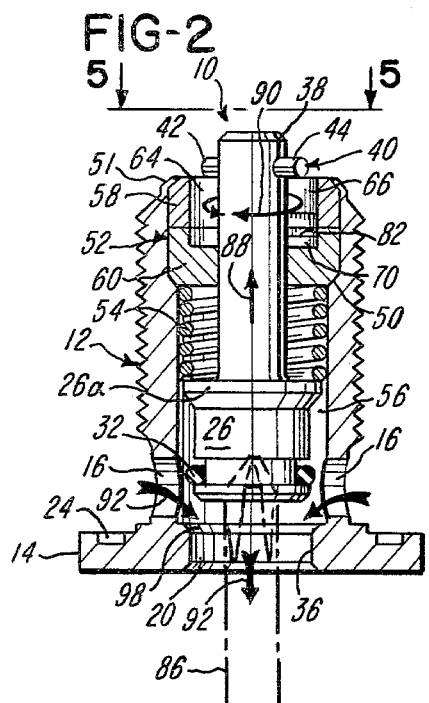
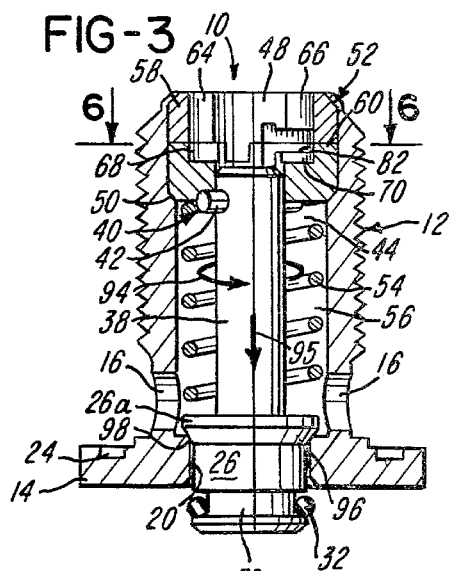
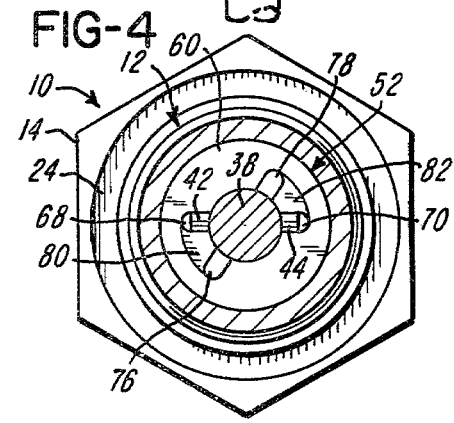
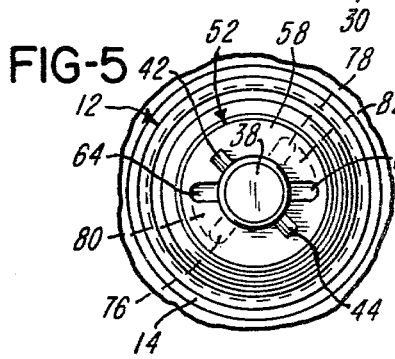
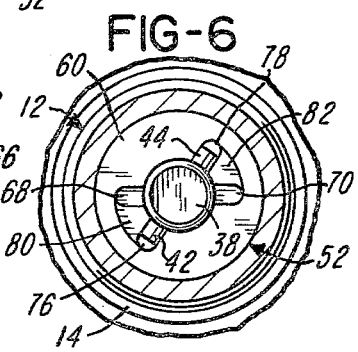
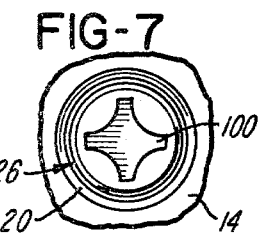

DRAIN VALVE

BACKGROUND OF THE INVENTION

The present invention relates to drain valves and, more particularly, to drain valves used in fuel tanks or the like. However, the valves could also be used for various other purposes in connection with confined fluids.

Drain valves are often provided on aircraft fuel tanks so that liquid within the tank may be readily removed or drained. Such drain valves typically include a drain port or opening through which the liquid in the tank is drained and a valve member or poppet which moves axially in relation to the port in order to open and close the port.

One difficulty encountered with drain valves of the type described above is that a seal used in conjunction with the valve member for closing the drain port will deteriorate over a period of time and require replacement. To aid in the replacement of the seal, prior drain valves have included features, such as those disclosed in U.S. Pat. No. 3,698,420, issued to Douglas Grundy et al, and in U.S. Pat. No. 3,703,189, issued to Floyd G. Koller, that permit the valve member to be moved to an accessible position below the drain port so that the seal on the valve member can be removed and replaced without removing and disassembling the entire drain valve.

A problem associated with prior drain valves of the type shown in the aforementioned Grundy et al and Koller patents is that considerable complexity is encountered in the manufacture and assembly of the drain valves in order to permit the valve member to occupy several positions in relation to the drain port. Such complexity increases the difficulty of manufacture and the cost of the drain valves.

SUMMARY OF THE INVENTION

There is provided, in accordance with the present invention, a drain valve for use with a fuel tank, such drain valve having an axially movable poppet or valve member for assuming any one of three positions in relation to the port of the drain valve. In a first position, the valve member is located at the port in order to sealingly engage and close the port and thereby prevent fluid within the tank from being drained through the port. In a second position, the valve member is moved axially away from the drain port in order to open the port and permit the draining of fluid. In a third position, the valve member is extended through the drain port to the exterior of the fuel tank so that a seal on the valve member is exposed and can be removed and replaced. A valve stem is connected at one end to the valve member. Stop means, in the form of a pin having ends projecting from an opposite end of the valve stem, cooperates with a retainer means or assembly in order to support the valve member in the first and second positions. In the third position, the valve member is supported by engagement with a metal seat on the valve housing while the retainer means maintains the angular position of the valve member.

The retainer assembly is advantageously constructed, in accordance with the present invention, from two identical, interfitting retainer members. The retainer members each include an interfitting face or side having a projection and a corresponding recess so that when the two retainer members are interfitted, the projection of each is received in the recess of the other. When interfitted, the retainer members form an axial through-bore for receiving the valve stem, and a passage for receiving the ends of the pin. The passage includes axial slots in each retainer member adjacent the through-bore and two pockets on the interfitting side of each retainer member disposed radially from the axial slots. An opening on the interfitting sides extend between each pocket and one of the axial slots. When the retainer members are interfitted, the pockets of each retainer member align with the axial slots of the other retainer member.

The pockets in one of the retainer members provides first, upwardly facing abutment surfaces against which the ends of the pin abut to support the valve member in the first position. The top surface of the retainer assembly, which is formed by a side of one of the retainer members opposite the interfitting sides, provides a second abutment surface against which the ends of the pin abut to support the valve member in the second position. Finally, the ends of the pin are moved through the passage through the opposite, lower side of the retainer assembly to locate the valve member in the third position.

It is, therefore, an object of the present invention to provide an improved drain valve.

It is another object of the present invention to provide an improved drain valve of the type having a valve member with three positions, including a first, closed position, a second, open position, and a third, lowered position for exposing a seal on the valve member for replacement.

Still another object of the present invention is to provide a drain valve of the type described above which may be easily and inexpensively manufactured.

These and other objects and advantages of the present invention will become apparent when taken in conjunction with the following description and the attached drawings.

BRIEF DESCRIPTION OF THE DRAWINGS

FIG. 1 is a transverse sectional view of a drain valve in accordance with the present invention, with the valve member of the drain valve shown in a first, closed position.

FIG. 2 is the same view as FIG. 1, but showing the valve member in a second, open position.

FIG. 3 is the same view as FIG. 1, but showing the valve member in a third position for replacing a seal on the valve member.

FIG. 4 is a sectional view taken along the line 4—4 of FIG. 1.

FIG. 5 is a top plan view of the drain valve, taken along the line 5—5 of FIG. 2.

FIG. 6 is a sectional view of a portion of the drain valve indicated by arrows 6—6 of FIG. 3. The FIG. 6 section is the same as the corresponding portion of the FIG. 4 section but illustrates parts in a different position.

FIG. 7 is a bottom view of the valve member, taken along the line 7—7 of FIG. 1.

DETAILED DESCRIPTION OF THE PREFERRED EMBODIMENT

Figure 8:
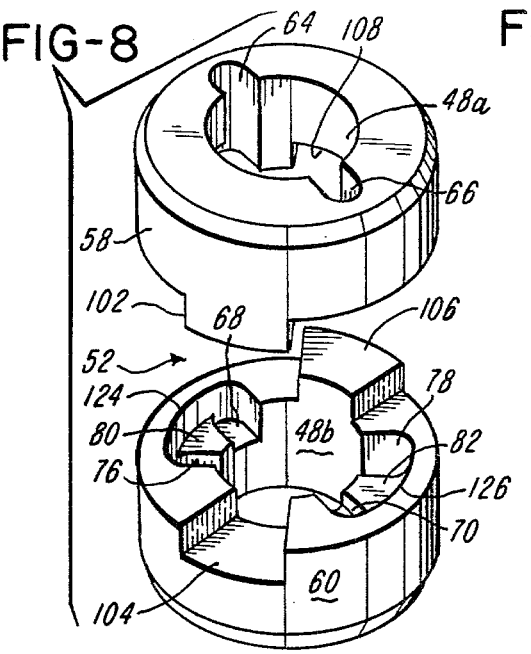
FIG. 8 is an enlarged, exploded perspective view of the retainer assembly of the drain valve of FIG. 1.
Figure 9:
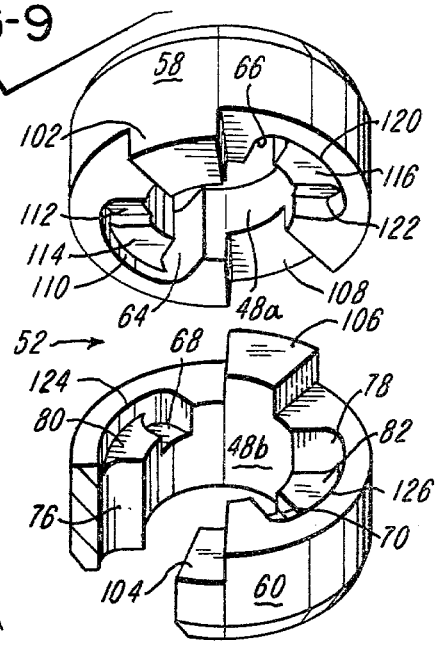
FIG. 9 is the same view of the retainer assembly as in FIG. 8, but with the top retainer member turned, and the bottom retainer member partially broken away, to better illustrate the details of the interfitting sides of both retainer members.

Turning now to the drawings, there is shown in FIGS. 1, 2, and 3 a drain valve 10 in accordance with the present invention. The drain valve 10 includes an externally threaded, hollow, tubular housing 12 having an integral lower or base portion 14. As conventional and illustrated, for example, in said Koller U.S. Pat. No. 3,703,189, the drain valve 10 can be fitted onto a fuel tank (not shown) by threading the housing 12 into a mounting nut (also not shown) that is formed or secured on the inside wall of the fuel tank. The mounting nut has a plurality of openings cooperating with openings 16 on the cylindrical housing 12 so that, when the drain valve is opened, liquid from within the tank may flow through a circular drain opening or port 20 at the center of the base portion 14. The base portion 14 has an annular recess 24 for receiving an O-ring sealing member (not shown) in order to seal the base portion 14 at its juncture with the fuel tank.

The drain valve 10 further includes a cylindrical poppet or valve member 26 that moves axially in relation to the drain port 20 to stop the flow of the liquid through the drain port. The valve member 26 includes an annular recess or groove 30 for receiving an O-ring sealing member 32 so that, when the valve member 26 is in a first position closing the drain port 20, as shown in FIG. 1, the O-ring 32 provides a seal between the valve member 26 and the inside annular wall 36 of the housing 12 that bounds the drain port 20.

An axial valve stem 38 is connected at one end to the valve member 26, and has a pin 40 fixedly connected adjacent its opposite end. Ends 42 and 44 of the pin 40 project in a perpendicular direction from the axis of the valve stem 38. When the drain valve 10 is assembled, the valve stem 38 is received in an axial through-bore 48 of a cylindrical retainer assembly, generally designated 52, which is in coaxial relationship with the drain port 20, the valve member 26 and the valve stem 38. As will become apparent, the retainer assembly 52 functions generally to retain the proper position of the valve member 26, the stem 38, and the pin 40, the retainer assembly 52 performing both supporting and guiding functions.

The retainer assembly 52 is supported upon a shoulder 50 within a large diameter upper portion of the bore of the housing 12 and is fixedly clamped against the shoulder 50 by an overhanging lip 51 at the extreme upper end of the housing 12. In accordance with this invention, the pin 40 functions as stop means cooperating with the retainer assembly 52 to support the valve member 26 in the two positions thereof shown in FIGS. 1 and 2 and is dropped to the bottom of the retainer assembly 52 when the valve member 26 is moved to the position shown in FIG. 3. The valve member 26 is resiliently biased away from the retainer assembly 52, i.e. downwardly, by a spring 54 that is trapped within an interior chamber 56 formed by the bore of the housing 12 beneath the retainer assembly 52, the spring 54 acting between an enlarged upper end 26a of the valve member 26 and the bottom of the retainer assembly 52.

The retainer assembly 52 will be described in greater detail later with reference to FIGS. 8 through 14. Briefly, as shown in FIGS. 1 through 3, the retainer assembly 52 is comprised of two identical retainer members, an upper member 58 and a lower member 60, that interfit and are held together at the top of the housing 12. Each of the retainer members 58 and 60 has a pair of diametrically aligned and opposed axial through-slots adjacent and opening to the through-bore 48 that provide part of a passage for the projecting ends 42 and 44 of the pin 40. When the retainer members are interfitted, the pair of through-slots in the upper retainer member 58, such slots being designated in the drawings as 64 and 66, are in axial alignment with a pair of upwardly facing pockets 68 and 70 in the lower retainer member 60. As shown in FIG. 1, the bases of the pockets 68 and 70 confronting the slots 64 and 66 provide abutment surfaces for supporting the ends 42 and 44 of the pin 40 in order to, in turn, support the valve member 26 in the first position. The pair of slots in the lower retainer member 60, such slots designated 76 and 78 and seen in FIGS. 4 and 6, are circumferentially disposed from the pockets 68 and 70 in the lower member 58, and are also circumferentially disposed from the slots 64 and 66 in the upper retainer member 58. For reasons which will become apparent, the lower retainer member 60 has diametrically opposed, slightly raised lands 80 and 82, respectively, separating the pocket 68 from slot 76 and the pocket 70 from the slot 78.

The ends of the pin 40 are moved either through the upper retainer member slots 64, 66 or the lower retainer member slots 76, 78 as desired to cause the valve member 26 to assume any one of the three positions shown in FIGS. 1, 2 and 3. In the first position, briefly described earlier and shown in FIGS. 1 and 4, the valve member 26 closes the port 20. The spring 54 biases the valve member 26 downwardly so that the ends 42 and 44 on the pin 40 are firmly held in abutment against the upwardly facing bases of the pockets 68 and 70 of the retainer member 60. The pin ends 42 and 44 are thus securely trapped by the walls of the pockets, and the valve member 26 will remain in this closed position until purposely manually moved to one of the other positions.

In FIGS. 2 and 5, the valve member 26 is shown moved to a second, open position, with the valve member elevated away from the port 20. The valve member 26 is moved to the open position with the use of a tool, such as a Phillips screwdriver 86 shown in phantom in FIG. 2, engaging a suitably shaped recess 100 (FIG. 7) in the exposed bottom end face of the valve member 26. As illustrated by an arrow 88 in FIG. 2, the valve member 26 is first manually moved axially upwardly so that the pin ends 42 and 44 pass through the upper retainer member slots 64 and 66 to the top side of the upper retainer member 58. The O-ring seal 32 of the valve member 26 is thereby moved above the port 20 so that liquid from within the fuel tank can drain through the openings 16 and then out the port 20, as indicated by arrows 92 in FIG. 2. The valve open condition can be retained by rotating the valve member 26 in either direction, as indicated by circular arrow 90 in FIG. 2, so that the ends of the pin 40 are rotated away from the slots 64 and 66. The screwdriver 86 may then be disengaged whereupon the downward biasing of the valve member 26 by the spring 54 causes the projecting ends of the pin 40 to be firmly held against the top side of the upper retainer member 58 so that the valve will remain open. To thereafter close the valve, the valve member 26 is again engaged by the screwdriver 86 and rotated in either direction to align the pin 40 with the upper retainer member slots 64 and 66. The valve member 26 can then be lowered under influence of the spring 54 until the pin ends 42 and 44 are again received by the lower retainer member pockets 68 and 70. The valve is thus returned to its closed position shown in FIG. 1.

In FIGS. 3 and 6, there is shown a third position of the valve member 26, with the valve member 26 extending completely through the port 20 to expose the O-ring seal 32 for inspection or replacement. In order to move the valve member 26 to the third position from the first position illustrated in FIG. 1, the valve member 26 is again engaged by the screwdriver 86 and elevated slightly upwardly to move the ends 42 and 44 of the pin 40 out of the lower retainer member pockets 68 and 70 to just above the level of the lands 80 and 82. Then, as indicated by a circular arrow 94 in FIG. 3, the valve member is rotated in counterclockwise direction as viewed from the top of the drain valve to move the pin ends 42 and 44 into alignment with the lower retainer member slots 76 and 78. The valve member 26 can then be lowered as indicated by arrows 95 in FIG. 3 until a conical valve surface 96 of the enlarged valve end 26a contacts a beveled valve surface 98 formed on the upper end of the port 20. The conical surface 96 thus provides a temporary seal at the port 20 while the O-ring 32 is being inspected or replaced. At this time, the pin 40 is located at the bottom of the slots 76 and 78, and the valve member 26 is supported within the housing 12 by virtue of the engagement of the valve surfaces 96 and 98. Preferably, the several parts of the valve are so sized that the pin ends 42 and 44 will remain at least partially in the lower retainer member slots 76 and 78, as illustrated in FIG. 3, so that the pin 40 will be retained in proper rotary alignment therewith.

The valve member 26 can be returned from its third, lowered position to its first, valve closed, position by pushing upwardly on the valve member 26 by the screwdriver 86 until the pin ends 42 and 44 engage the downwardly facing bases of upper retainer member pockets 112 and 122, which will be described below. By then lowering the valve member 26 sufficiently to permit the pin ends 42 and 44 to clear upper retainer member lands, which lands are described below, the valve member 26 can then be rotated in a clockwise direction as viewed from the top of the drain valve until the pin ends 42 and 44 engage the walls of the upper retainer member slots 64 and 66 and lower retainer member pockets 68 and 70. At this time, the screwdriver 86 can be disengaged from the valve member 26 whereupon the spring 54 lowers the valve member 26 until the pin ends 42 and 44 are again located within the lower retainer member pockets 68 and 70, the parts thus being returned to the position thereof illustrated in FIG. 1.

In practice, the person manipulating the screwdriver 86 to move the valve member 26 from the first postition to the third position will first simply rotate the valve member 26 whereupon the pin 40 cams over the lands 80 and 82. Thus, there is no need for a noticeable elevation of the valve member to clear the lands. Similarly, when returning the valve member 26 from the third position to the first position, the valve member 26 is first elevated until the pin 40 abuts the confronting downwardly facing surface of the upper retainer member 58. The valve member 26 is then reversely rotated, no noticeable axial repositioning of the valve member being needed to enable the pin 40 to again clear the lands.

The details of the construction of the retainer members 58 and 60, and the manner in which they are interfitted to form the retainer assembly 52, are shown in FIGS. 8 through 14. As mentioned earlier, and as seen best in FIGS. 8 and 9, the two identical retainer members 58 and 60 each have a projection and a correspondingly shaped recess on their interfitting sides that permit the retainer members to be appropriately interfitted. The projection, designated 102, of retainer member 58 fits within the recess, designated 104, of retainer member 60. Likewise, the projection, designated 106, of retainer member 60 fits within the recess, designated 108, of retainer member 58.

With reference to FIGS. 8 through 14, the axial throughbore 48 of retainer assembly 52 is shown as comprised of an axial bore 48a in the top retainer member 58 and an axial bore 48b in the bottom retainer member 60. The previously mentioned slots 64 and 66 in the upper retainer member 58 extend adjacent bore 48a and the previously mentioned slots 76 and 78 in the lower retainer member 60 extend adjacent the bore 48b. The interfitting side of the upper retainer member 58 has an arcuate opening 110 (FIG. 9) extending between the slot 64 and the pocket 112, and a slightly raised land 114 in the arcuate opening 110 separates the slot 64 and the pocket 112. The interfitting side of retainer member 58 also has a slightly raised land 116 in an arcuate opening 120 (FIG. 9) extending between the slot 66 and a pocket 122.

Likewise, the interfitting side of the lower retainer member 60 has an arcuate opening 124 between its through-slot 76 and the pocket 68, and an arcuate opening 126 between its through-slot 78 and the pocket 70. Previously mentioned land 80 is in the arcuate opening 124 and separates the slot 76 from the pocket 68, and previously mentioned land 82 is in arcuate opening 126 and separates the slot 78 from the pocket 70.

Figure 13:
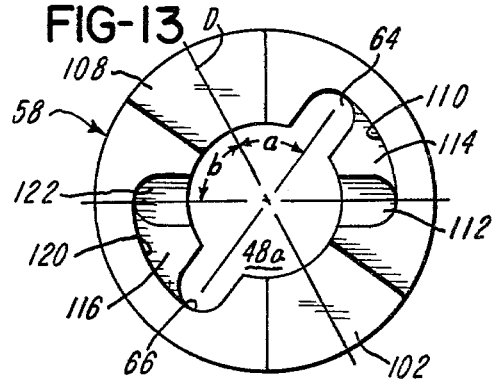
FIG. 13 is a bottom view of the top retainer member, taken generally along the line 13—13 of FIG. 11.
Figure 14:
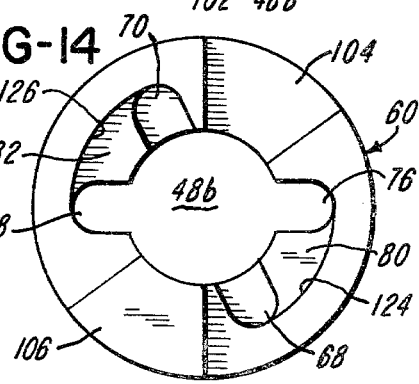
FIG. 14 is a top view of the bottom retainer member, taken generally along the line 14—14 of FIG. 11.

With reference to FIG. 13, it will be noted that the projection 102 and the recess 108 of the upper retainer member 58 are centered on a common diameter D. The slots 64 and 66 are also diametrically opposed as are the respective pockets 112 and 122 and the respective lands 114 and 116. The actute angle a between the aforementioned diameter D and the common diameter of the slots 64 and 66 is equal to the acute angle b between the aforementioned common diameter D and the common diameter of the pockets 112 and 122. Since the lower retainer member 60 is identically constructed, the alignment of slots in the upper retainer member with pockets in the lower retainer member, and vice versa, is assured by virtue of the fact that the projections 102 and 106 are fitted into the cooperating recesses 104 and 108. For the same reasons, the upper retainer member lands 114 and 116 confront, respectively, the lower retainer member lands 80 and 82. For purposes of proper assembly, the arcuate extent of the projections 102 and 106 is only slightly smaller than the arcuate extent of the recesses 104 and 108.

Figure 10:
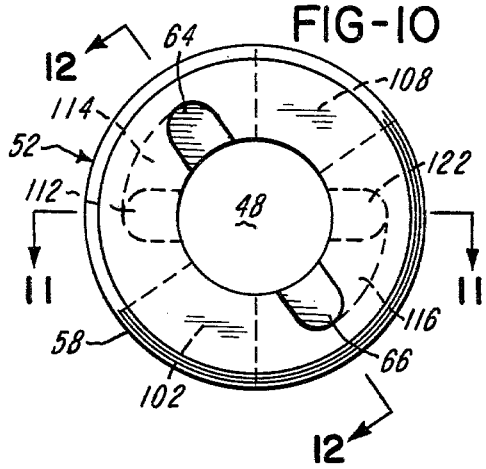
FIG. 10 is a top plan view of the retainer assembly.
Figure 11:
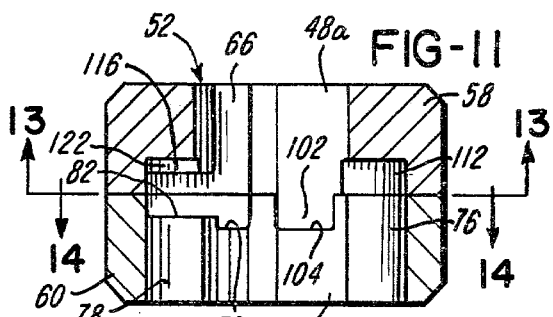
FIG. 11 is a sectional view of the retainer assembly, taken along the line 11—11 of FIG. 10.
Figure 12:
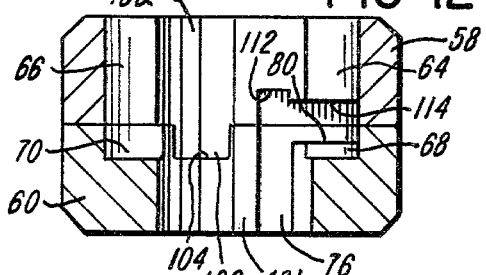
FIG. 12 is a sectional view of the retainer assembly, taken along the line 12—12 of FIG. 10.

FIGS. 10, 11 and 12 show the passage formed by the interfitting retainer members 58 and 60 for receiving the ends 42 and 44 of the pin 40. The pin 40 is so sized that, as shown in FIG. 11, there is sufficient clearance between the land 116 in the upper retainer member 58 and the confronting land 82 in the lower retainer member 60 that one of the ends of the pin 40 may be passed from alignment with the upper retainer member slot 66 to the lower retainer member slot 78. Likewise, there is sufficient clearance, as shown in FIG. 12, between the confronting lands 80 and 114 that the other of the ends of the pin 40 may pass between the lands 80 and 114 from alignment with the slot 64 in the upper retainer member 58 to the slot 76 in the lower retainer member 60.

In summary, it is seen that the retainer assembly 52 provides a first pair of diametrically opposed and aligned slots 64 and 66 in the upper retainer member 58, the slots opening to the top of the retainer assembly 52, and a circumferentially offset second pair of diametrically aligned and opposed slots 76 and 78 in the lower retainer member 60, the latter slots opening to the bottom of the retainer assembly. The arcuate openings in the confronting faces of the retainer members and the lands located in such openings confront one another and provide passageway portions that may be thought of as transition passageways or grooves intermediate the top and bottom of the retainer assembly 52. For routine use, the drain valve is normally closed, with the pin 40 being held against the upwardly facing bases of the lower retainer member pockets 68 and 70, and the valve is opened for draining by simply pushing upwardly on the valve member so that the pin 40 rides through the upper retainer member slots 64 and 66. The top surface of the upper retainer member 58 conveniently serves as an abutment surface in the event it is desired to leave the valve in its opened position. Only when it is desired to inspect or replace the O-ring sealing member 32 will the valve member 26 be rotated to thereupon cause the pin 40 to pass arcuately through the transition grooves created by the confronting arcuate openings of the two retainer members 58 and 60 so as to position the ends of the pin 40 over the lower retainer member slots 76 and 78. At all times, the axial orientation of the valve member 26 and its stem 38 is maintained by the through-bore 48 in the retainer assembly 52. Except when the valve is in the retained-open position illustrated in FIG. 2, the passage formed by the retainer member slots and the transition grooves guides the movement of the pin 40 therethrough.

It should be apparent from the foregoing description that the parts of the drain valve 10 can be both inexpensively manufactured and easily assembled. The retainer members 58 and 60 may be conveniently made from molded plastic, substantially eliminating the need to mill or machine parts of the drain valve. Since the upper and lower retainer members are identical, a single mold can be used to produce both retainer members. They are automatically properly aligned with one another when assembled into the housing 12. There is no need during assembly to be concerned with the relative circumferential alignment of the retainer assembly 52 with other parts of the valve because of the coaxial arrangement of the housing 12, the port 20, the valve member 26, the stem 38, the spring 54, and the retainer assembly 52. During assembly, the valve member 26 and its stem 38 can simply be inserted from the top of the housing 12 into the bore of the housing 12, followed by insertion of the spring 54 and the two retainer members 58 and 60, after which the lip 51 is formed to hold the parts assembled.

Although the presently preferred embodiment of the present invention has been described, it will be understood that within the purview of the invention various changes may be made within the scope of the appended claims.

Having thus described our invention, we claim:

1. In a drain valve of the type having a housing with a port, a valve member movable along an axis extending through said housing and said port, means for supporting said valve member in a first position for closing said port and in a second position for opening said port, and bias means operatively engaged with said valve member to bias said valve member in a direction along said axis that would extend said valve member outwardly of said housing through said port, the improvement wherein said valve member supporting means comprises:

stop means connected to said valve member for movement therewith; and retainer means including means forming a passage through which said axis extends for receiving said stop means, said retainer means having an abutment surface facing away from said port and comprising two substantially identical retainer members having mutually interfitting surface means for maintaining a predetermined orientation therebetween, the surface of one of said retainer members opposite said interfitting surface means thereof facing said port and being located nearer said port than the corresponding surface of the other of said retainer members, said corresponding surface facing away from said port, said abutment surface comprising a surface portion of said one of said retainer members, said stop means being movable along said passage to said abutment surface against which said stop means is held by said bias means in a location adjacent said interfitting surface means to locate said valve member in one of said first and second positions.

2. In a drain valve of the type having housing means with a port, a valve member guided for movement along an axis extending through said housing means and said port between a first position for closing said port and a second position for opening said port, and bias means operatively engaged with said valve member to bias said valve member in a direction along said axis that would extend said valve member outwardly of said housing through said port, the improvement comprising:

stop means connected to said valve member for movement therewith; and retainer means including means forming a passage through which said axis extends for receiving said stop means, said retainer means having first and second abutment surfaces facing away from said port and cooperating with said stop means for locating said valve member in said first position and in said second position, said retainer means comprising two substantially identical retainer members having mutually interfitting surface means for maintaining a predetermined orientation therebetween and forming a passage through which said axis extends for receiving said stop means, said first abutment surface comprising a surface portion of one of said retainer members, and said second abutment surface comprising a surface portion of the other of said retainer members said stop means being movable along said passage between said first abutment surface against which said stop means is held by said bias means to locate said valve member in said first position and said second abutment surface against which said stop means is held by said bias means to locate said valve member in said second position.

3. The drain valve of claim 2 wherein said valve member is axially movable from one of said first and second positions to a third position in which said valve member extends through said port to expose a sealing member thereon, and wherein said stop means is movable along said passage away from one of said first and second abutment surfaces to permit movement of said valve member to said third position.

4. The drain valve of claim 3, further comprising a valve stem connected to said valve member, wherein said stop means comprises a pin projecting from said valve stem, and wherein said retainer means includes an axial through-bore for receiving said valve stem.

5. The drain valve of claim 4, wherein said passage includes an axial slot in each of said retainer members adjacent said axial through-bore for receiving said pin.

6. In a drain valve of the type having a port and a valve member guided for axial movement relative to said port between a first position for closing said port and a second position for opening said port, the improvement comprising:

a valve stem connected to said valve member;
stop means connected to said valve member, said stop means comprising a pin projecting from said valve stem; and
retainer means including a axial through-bore for receiving said valve stem and having first and second abutment surfaces cooperating with said stop means for supporting said valve member in said first position and in said second position, said retainer means comprising two substantially identical retainer members interfitting to form a passage for receiving said stop means, each of said retainer members having an interfitting side, each interfitting side having a projection and a corresponding recess so that, when said retainer members are interfitted, said projection on each of said retainer members is received in said corresponding recess of the other of said retainer members, with said stop means movable along said passage between said first abutment surface against which said stop means abuts to support said valve member in said first position and said second abutment surface against which said stop means abuts to support said valve member in said second position, said valve member being axially movable from one of said first and second positions to a third position in which said valve member extends through said port to expose a sealing member thereon, said stop means being movable along said passage away from one of said first and second abutment surfaces to permit movement of said valve member to said third position, and said passage including an axial slot in each of said retainer members adjacent said axial through-bore for receiving said pin.

7. The drain valve of claim 6, wherein said axial slot in one of said retainer members is circumferentially spaced from said axial slot in the other of said retainer members when said retainer members are interfitted.

8. The drain valve of claim 7 wherein said interfitting side of each of said retainer members includes a pocket circumferentially spaced from said axial slot therein and an arcuate opening forming part of said passage extending from said pocket to said axial slot, said pocket of one of said retainer members confronting and axially aligned with said axial slot of the other of said retainer members when said retainer members are interfitted.

9. The drain valve of claim 8 wherein the base of said pocket in one of said two retainer members provides said first abutment surface of said retainer means.

10. The drain valve of claim 8 wherein a side opposite the interfitting side of one of said retainer members provides said second abutment surface when said two retainer members are interfitted.

11. A drain valve, comprising:

a housing having a drain port at its lower end;
a valve member;
a seal on said valve member;
said valve member being movable along the axis of said port from a first position wherein it closes said port to a second position above said port so that liquid may pass through said port, and to a third position wherein it is extended through said port to permit replacement of said seal;
an axially extending stem connected at one end to said valve member;
a pin adjacent the other end of said stem and having at least one end projecting from said stem in a direction generally perpendicular to the axis of said stem;
a retainer assembly mounted in said housing in fixed relation to said port and having an axial throughbore for receiving said stem and having passage means extending from the top of said retainer assembly to the bottom of said retainer assembly;
said passage means comprising means forming a first slot extending along and opening to a first portion of said through-bore and also opening to the top of said retainer assembly for receiving said pin and a second slot extending along and opening to a second portion of said through-bore and also opening to the bottom of said retainer assembly for receiving said pin, said first slot being circumferentially spaced from said second slot, and means forming passageway portions intermediate the top and bottom of said retainer assembly connecting said first slot to said second slot;
a spring trapped between said retainer assembly and said valve member for biasing said valve member downwardly;
said retainer assembly having abutment surfaces confronting said first slot to support said valve member in said first position; and
said valve member being manipulable against the bias of said spring to open said port with said pin projecting into said first slot and said valve member being further manipulable by rotation to pass said pin through said passageway portions into alignment with said second slot to enable lowering of said valve member to expose said seal.

12. A drain valve, comprising:

a housing having a drain port at its lower end;
a valve member;
a seal on said valve member;
said valve member being movable along the axis of said port from a first position wherein it closes said port to a second position above said port so that liquid may pass through said port, and to a third position wherein it is extended through said port to permit replacement of said seal;
an axially extending stem connected at one end to said valve member;

a pin adjacent the other end of said stem and having at least one end projecting from said stem in a direction generally perpendicular to the axis of said stem;

a retainer assembly mounted in said housing in fixed relation to said port and having an axial through-bore for receiving said stem and having passage means extending from the top of said retainer assembly to the bottom of said retainer assembly;

said passage means comprising means forming a first slot extending along and opening to a first portion of said through-bore and also opening to the top of said retainer assembly for receiving said pin and a second slot extending along and opening to a second portion of said through-bore and also opening to the bottom of said retainer assembly for receiving said pin, said first slot being circumferentially spaced from said second slot, and means forming passageway portions intermediate the top and bottom of said retainer assembly connecting said first slot to said second slot;

said retainer being comprised of two substantially identical retainer members, namely an upper retainer member and a lower retainer member, the confronting sides of said retainer members each having a projection and a recess with the projection of one of said retainer members interfitted with the recess of the other of said retainer members, said first slot extending through said upper retainer member and said second slot extending through said lower retainer member;

a spring trapped between said retainer assembly and said valve member for biasing said valve member downwardly;

said retainer assembly having abutment surfaces confronting said first slot to support said valve member in said first position; and said valve member being manipulable against the bias of said spring to open said port with said pin projecting into said first slot and said valve member being further manipulable by rotation to pass said pin through said passageway portions into alignment with said second slot to enable lowering of said valve member to expose said seal.

13. The drain valve of claim 11 or 12 wherein both ends of said pin project from said stem, wherein said passage means comprises a third slot that is diametrically opposed to said first slot and that extends along and opens to said first portion of said through-bore and also opens to said top of said retainer assembly, wherein said passage means further comprises a fourth slot diametrically opposed to said second slot that extends along and opens to said second portion of said through-bore and also opens to said bottom of said retainer assembly, and wherein said passageway portions connect said third slot to said fourth slot.

* * * * *